United States Patent [19]
Matsui

[11] Patent Number: 4,835,561
[45] Date of Patent: May 30, 1989

[54] FOCUS DETECTING DEVICE FOR CAMERA

[75] Inventor: Toru Matsui, Sakai, Japan

[73] Assignee: Minolta Camera Kabushiki Kaisha, Osaka, Japan

[21] Appl. No.: 240,413

[22] Filed: Sep. 1, 1988

Related U.S. Application Data

[63] Continuation of Ser. No. 15,938, Feb. 18, 1987, abandoned.

[30] Foreign Application Priority Data

Feb. 20, 1986 [JP] Japan .................................. 61-35673

[51] Int. Cl.⁴ .............................................. G03B 3/00
[52] U.S. Cl. .................................... 354/403; 354/406
[58] Field of Search ................ 354/403, 402, 406, 407

[56] References Cited

U.S. PATENT DOCUMENTS

| 4,504,135 | 3/1985 | Kawabata | 354/402 |
|---|---|---|---|
| 4,511,232 | 4/1985 | Yamada | 354/403 |
| 4,523,828 | 6/1985 | Kato | 354/403 |
| 4,571,047 | 2/1986 | Hirai | 354/403 |
| 4,595,271 | 6/1986 | Suda et al. | 354/403 |
| 4,602,861 | 7/1986 | Taniguchi et al. | 354/403 |

FOREIGN PATENT DOCUMENTS

| 57-154224 | 9/1982 | Japan . |
|---|---|---|
| 58-10605 | 1/1983 | Japan . |
| 58-59413 | 4/1983 | Japan . |
| 58-86504 | 5/1983 | Japan . |
| 59-33407 | 2/1984 | Japan . |
| 59-129839 | 7/1984 | Japan . |

Primary Examiner—Russell E. Adams
Attorney, Agent, or Firm—Price, Gess & Ubell

[57] ABSTRACT

A focus detecting device which is capable of focus detection under both passive and active type of autofocussing modes. The device has a light projecting element which projects light at specific wavelengths in a boundary region between visible light and infrared light, and a sensor which is responsive to both ambient light and the light projected from the light projecting element. A correction unit corrects chromatic aberration information stored in the photographing lens on the basis of the results of arithmetic operation of the output signals from the sensor generated with the light projecting member activated and deactivated. In the active type of autofocussing mode, utilizing the light projected from the light projecting element, the result of the focus detection is corrected by the corrected chromatic aberration information while the result of the focus detection is not subjected to any correction in the passive type of autofocussing mode utilizing the ambient light.

15 Claims, 10 Drawing Sheets

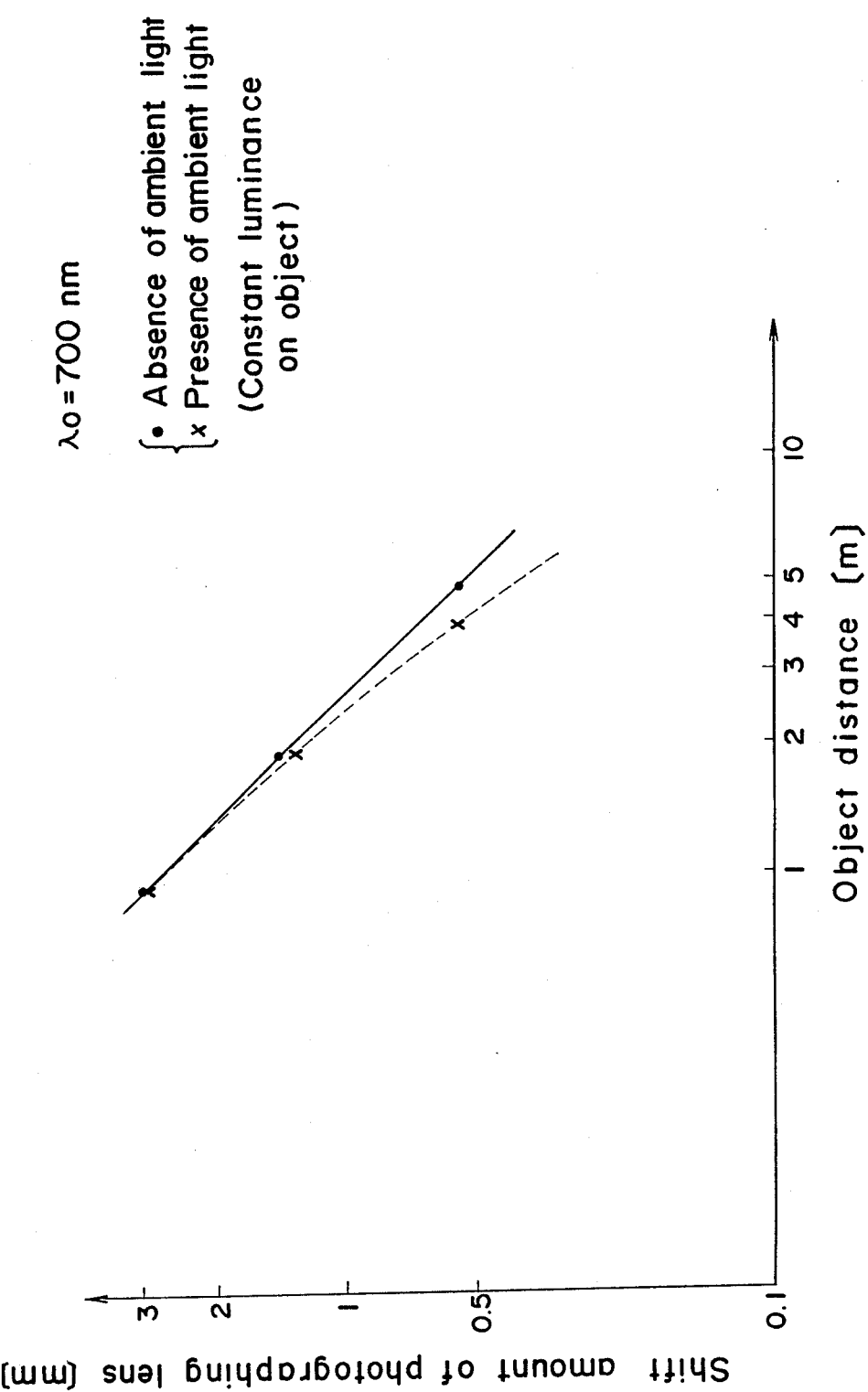

FOCUS DETECTING DEVICE FOR CAMERA

This is a continuation of application Ser. No. 015,938 filed on Feb. 18, 1987 abandoned.

BACKGROUND OF THE INVENTION

1. Field of the Invention

This invention relates to a focus detecting device for a camera having both passive system focus detection means which utilizes ambient light for focus detection (hereinafter referred to as "passive system") and active system focus detection means which utilizes for focus detection artificial light emitted by a light projecting element and reflected from an object to be photographed (hereinafter referred to as "active system").

2. Description of the Prior Art

In interchangeable lens type cameras, it is a general trend to employ a T.T.L. (through the lens) focus detecting device a T.T.L. focus detecting device so called a passive system which involves no limitation in object distance, has been most frequently employed in order to cope with the use of a variety of interchangeable lenses having different focal lengths and different F values at open aperture, but this system has a difficulty in that if the ambient light is not bright enough, good accuracy in focus detection is not obtainable or focus detection is not made possible. In order to overcome this difficulty, a complementary technique, so called an active system, has been employed in which, when the ambient light is dim, the object is illuminated through positive emission of an artificial light so as to help the focus detection. In this case, however, there is a problem that a near infrared beam which is not or little sensitive to the human eye is used for such illumination, the focus position deviates from that in the case of a visible light ray being used as a result of a variation in chromatic aberration for each interchangeable photographing lens between the near infrared beam and the visible light.

In an attempt to solve this problem, a variety of techniques have been proposed in the art.

(I) One prior art disclosure for such purpose is found in Japanese Published Unexamined Patent Application No. 57-154224. The camera disclosed therein has a focus detecting sensor for a focus condition detection on the basis of a light beam transmitted through an interchangeable photographing lens mounted on a camera body. For such a sensor, one having a wide wavelength sensitivity range (visible light~infrared rays) and high sensitivity to wave lengths of the infrared region is employed. Each interchangeable photographing lens used for the camera is provided with a mechanical signaling member which signals a focus deviation value corresponding to a difference in focal point between visible light and infrared radiation, and the camera body is provided with a shift member for shifting the sensor according to the signal from the signaling member so that in-focus photographing may be performed under visible light even when photographing lenses having different infrared chromatic aberrations are used.

(II) Another type of prior art disclosure is found in Japanese Published Unexamined Patent Application Nos. 58-59413 and 58-86504. The camera disclosed therein has a color temperature measuring means and an adjusting means for shifting each photographing lens according to the output of the color temperature measuring means so that a focus deviation may be corrected to a chromatic aberration value corresponding to the relevant one of the focal point differences between visible light and infrared rays which are stored in the lens.

(III) A further prior art disclosure is found in Japanese Published Unexamined Patent Application No. 59-129839. The camera disclosed therein has a focus detection sensor which is sensitive only to visible light and a focus detection sensor which is sensitive only to infrared rays. Each photographing lens has a read only memory (ROM) in which a focus deviation value corresponding to a focal point difference between visible light and infrared radiation is stored, and a discrimination element for determining which sensor is to be used for focal point detection according to the difference in the quantity of light between visible light and infrared radiation, whereby if the infrared ray sensor is used for focus detection, the focus detection signal obtained based on a signal from the sensor is corrected by a signal from the ROM corresponding to the focal point difference between the visible light and the infrared ray so that a corrected focus detection signal is issued on the basis of which focus adjustment is effected for the photographing lens.

Now, with the prior art arrangement described in (I) above, the difficulty is that since a sensor having a wide wavelength sensitivity range is employed as a focus detection sensor, a variation will be produced in chromatic aberration value according to the difference in color temperature between the two different light sources, i.e., ambient light and infrared rays utilized in illuminating the object, the variation in chromatic aberration value resulting in a variation in the focus position. This means that a mere correction according to a difference in focal point between visible light and infrared light is not sufficient to permit accurate focus detection.

The prior art arrangement described in (II) above has no such drawback with pointed out as regards to the first mentioned arrangement, but it has a disadvantage in that a color temperature measuring means is necessarily required, the entire setup is necessarily complicated with respect to the relative disposition of the optical system for color temperature measurement and the optical system for focus detection.

With the prior art arrangement described in (III) above, the difficulty is that two sensors, one for visible light and the other for infrared light, being necessarily required, the optical system is complicated, with a complex process of electrical processing involved.

SUMMARY OF THE INVENTION

In view of aforesaid difficulties with the prior art arrangements, the present invention has as its primary object the provision of a focus detecting device which eliminates the need for color temperature measuring means and which do not require focus detection sensors for both infrared light and visible light and yet permits efficient in-focus photographing under visible light even when the active system is used for focus detection.

In order to achieve this object, the present invention provides an improvement of a focus detecting device for a lens interchangeable camera which includes first focus detecting means of a passive type for detecting focus condition of an objective lens of an interchangeable lens with respect to an object to be photographed, with use of an ambient light illuminating the object and second focus detecting means of an active type for detecting focus condition of the objective lens with respect to the object with use of a light beam projected from a light projecting member to illuminate the object. The light beam projected from the light projecting member has specific wavelengths at a boundary region between visible light and infrared light. The improvement also includes control means for selectively actuating the first and second focus detecting means and this control means is provided with means for activating and deactivating the light projecting member upon actuation of the second focus detecting means. The improvement further includes sensor means which is responsible to both the ambient light and the light beam protected from the light projecting member, calculation means for calculating the difference between the output of the sensor means with the light projecting member activated and that of the sensor means with the light projecting member deactivated and dividing the difference by the output of the sensor means with the light projecting member activated so as to produce a correction signal, correction means for correcting a chromatic aberration signal by the correction signal, and output means which outputs the focus detection signal from the first focus detecting means upon actuation of the first focus detecting means and outputs the focus detection signal from the second focus detecting means and the corrected chromatic aberration signal from the correction means upon actuation of the second focus detecting means. The chromatic aberration signal is stored in storing means provided in the interchangeable lens and it is indicative of the chromatic aberration of the objective lens with respect to a specific wavelength of light.

The wavelength of light emitted by the light projecting means should preferably be within the range of 680~730 nm. The focus detection sensor should preferably have no sensitivity to infrared rays of longer waves than 730 nm.

With the construction as above described, the focus detecting device in accordance with the present invention permits proper and effective focus detection for visible light rays under both passive type and active type of autofocussing modes, without the necessity of focus detection sensors being provided for both infrared light and visible light and without the provision of separate color temperature measuring means.

The above and other objects, features, and advantages of the present invention will be apparent from the following description taken in connection with the accompanying drawings.

BRIEF DESCRIPTION OF THE DRAWINGS

FIGS. 6 to 10, inclusive, are views illustrating the reasons for limiting wavelengths of light rays emitted by light projecting means: of which FIG. 6 is a graph showing CIE standard spectral efficiency, FIG. 8 is a graph showing relative spectral distribution of a light source, FIG. 9 is a graph showing spectral sensitivity of the focus detection sensor and spectral transmittance of an infrared cut filter, and FIG. 10 is a graph showing the relationship between cut wavelengths of an infrared cut filter and the central wavelengths for the focus detection; and FIG. 11 is a view showing changes in focus position between the case of ambient light being available and the case of no ambient light being available.

DETAILED DESCRIPTION OF THE PREFERRED EMBODIMENTS

The focus detecting device in accordance with the invention includes passive system focus detection means for detecting a focal point by utilizing external light for focus detection, and active system focus detection means for detecting a focal point by utilizing reflected light from an object to be photographed which is illuminated by a light beam emitted by a light projecting means. The light projecting means comprises a source of light which emits light at specific wavelengths in a boundary region between visible light and infrared light. There are provided a focus detection sensor which is responsive to both reflected light from the object under no light emission by the light projecting means and reflected light from the object under light emission by the projecting means during active system focus detection, correction means for correcting chromatic information stored in a photographing lens on the basis of the results of arithmetic operation of signals from the focus detection sensor, and control means for controlling an in-focus position for the lens on the basis of the corrected information.

The wavelength of light emission from the light projecting means is preset within the range of 680~730 nm. Accordingly, the focus detection sensor is so designed that it has no sensitivity to infrared rays of longer wavelengths than 730 nm. The reasons for this will be explained with reference to FIGS. 6 to 10.

Figure 6:
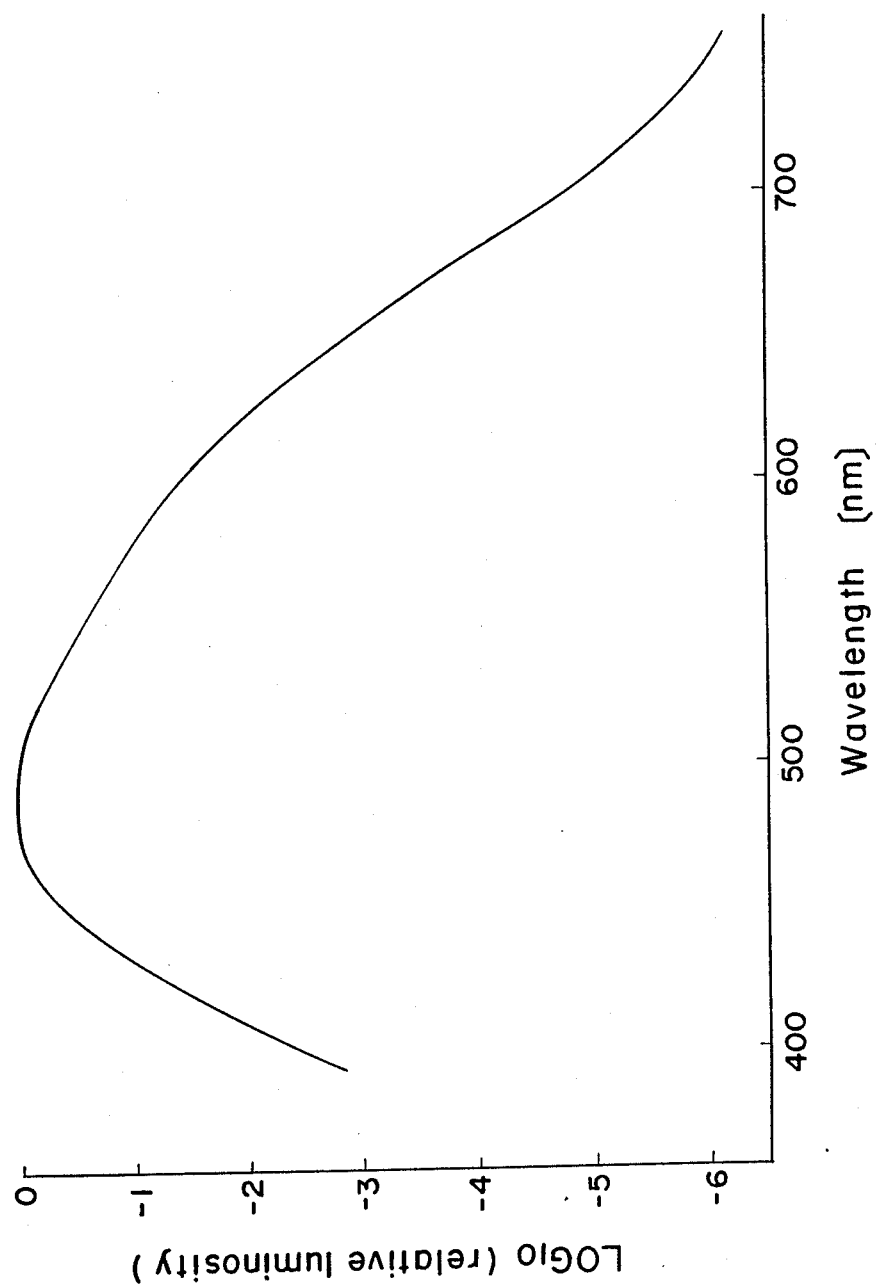

Important factors requiring consideration, when the focus detection is performed in a dark condition by projecting light toward the object, are: (1) degree of excitation of lighting to human eye, and (2) degree of the effect of a photographing lens upon chromatic aberration. As FIG. 6 shows, the degree of excitation of lighting to human eye varies depending upon the wavelength of lighting in such a way that from about the center of the visible light region toward the infrared light region, the larger the wavelength, the smaller is the excitation. At 700 nm, for example, the degree of excitation is about one tenth of that at 660 nm. When viewed in this way, it might be said that it would be desirable to use infrared light as artificial lighting for focus detection. In the case of infrared lighting, however, one problem is that it has considerable effect on chromatic aberration for the photographing lens. Another problem is that there is considerable difference in chromatic aberration between infrared lighting and ordinary lighting by such source as sunlight or fluorescent light, which largely contains visible range components. Also, in the case of ordinary lighting, it is a problem that some deviation is likely to be caused in focus position between a source of light containing a larger proportion of infrared light component than visible light component, such as tungsten light, and a source of light containing a very small proportion of infrared light component, such as fluorescent light.

Figure 7B:
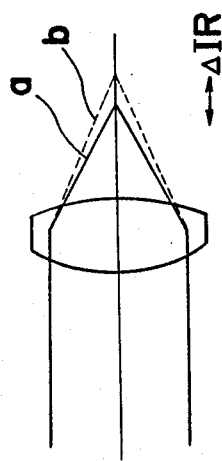
FIG. 7(b) is a view showing development of chromatic aberration due to the photographing lens.
Figure 7A:
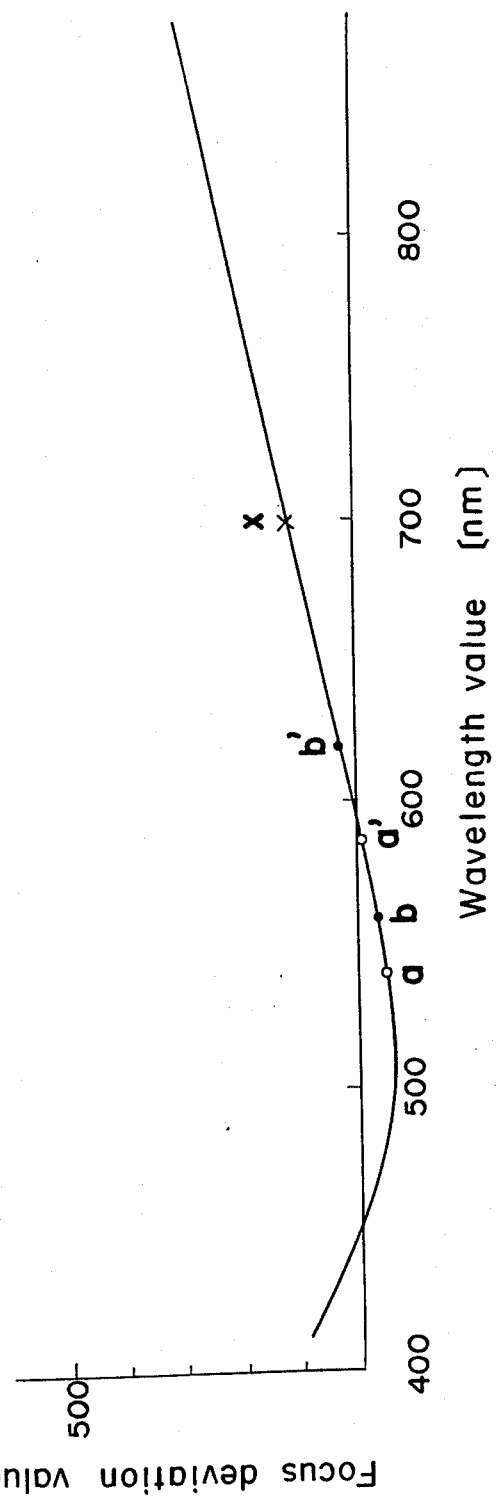
FIG. 7(a) is a graph showing the relationship between chromatic aberration of a photographing lens and wavelengths.

FIG. 7(a) is a graph showing the relationship between photolens chromatic aberrations and wavelengths. Abscissas are taken to represent wavelength values and ordinates are taken to represent focus deviation values ΔIR from the standard or d-line for 589 nm (standard wavelength of visible light). In FIG. 7(b) showing light rays which form an image through the photographing lens, light rays "a" represent visible light rays and light rays "b" represent infrared rays. Deviation ΔIR between the focus position under light rays "a" and the focus position under light rays "b" represents a chromatic aberration. As is apparent from the graph in FIG. 7(a) the larger the wavelength, the greater is the chromatic aberration ΔIR.

Figure 8:
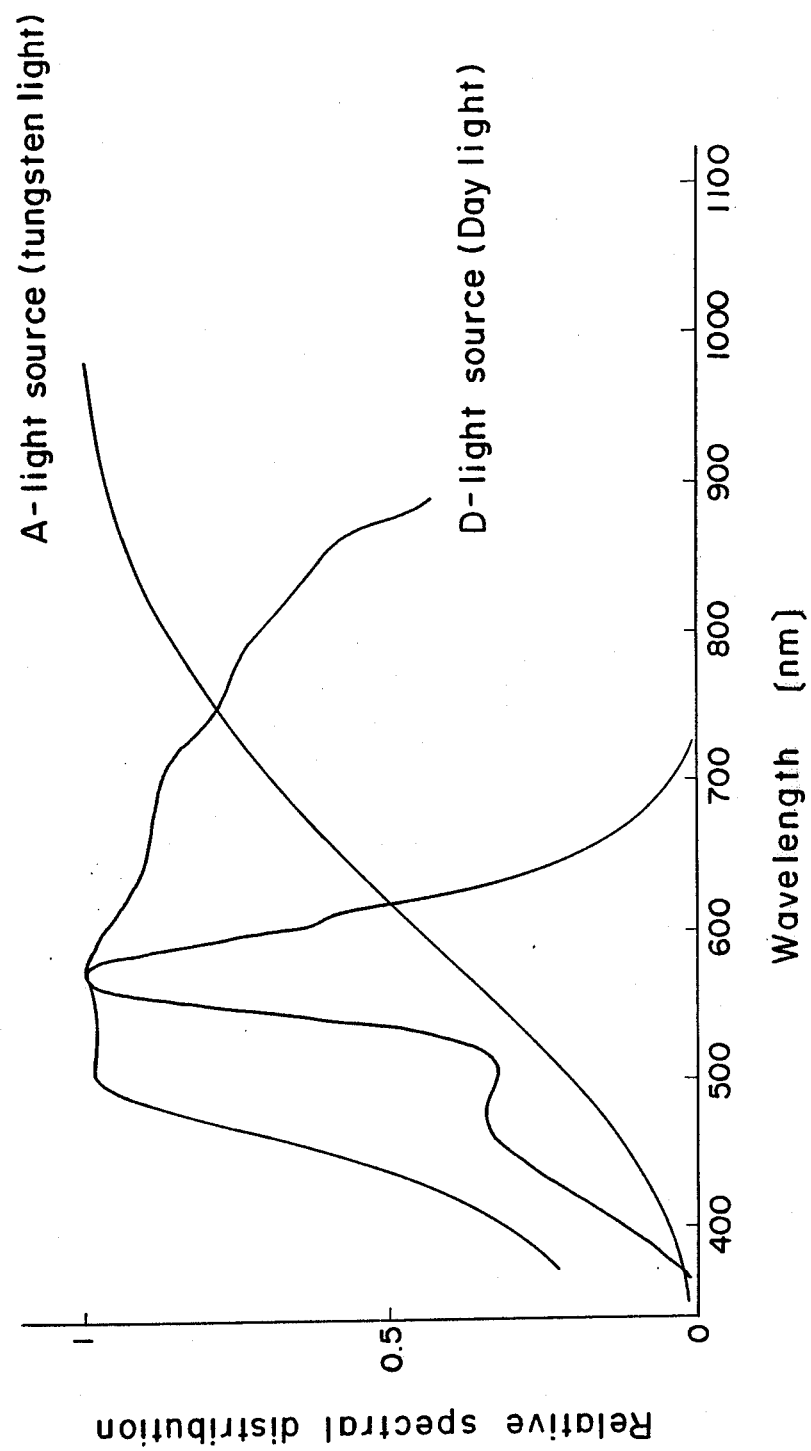

Here, let us consider how focus position deviations will be caused by variations in the source of light for lighting an object in the case of passive type of autofocussing operation for focus detection under ambient light. FIG. 8 shows relative spectral distribution with respect to some representative sources of light usually employed in lighting an object, in which the abscissa represents wavelength value and the ordinate represents relative spectral distribution.

Figure 9:
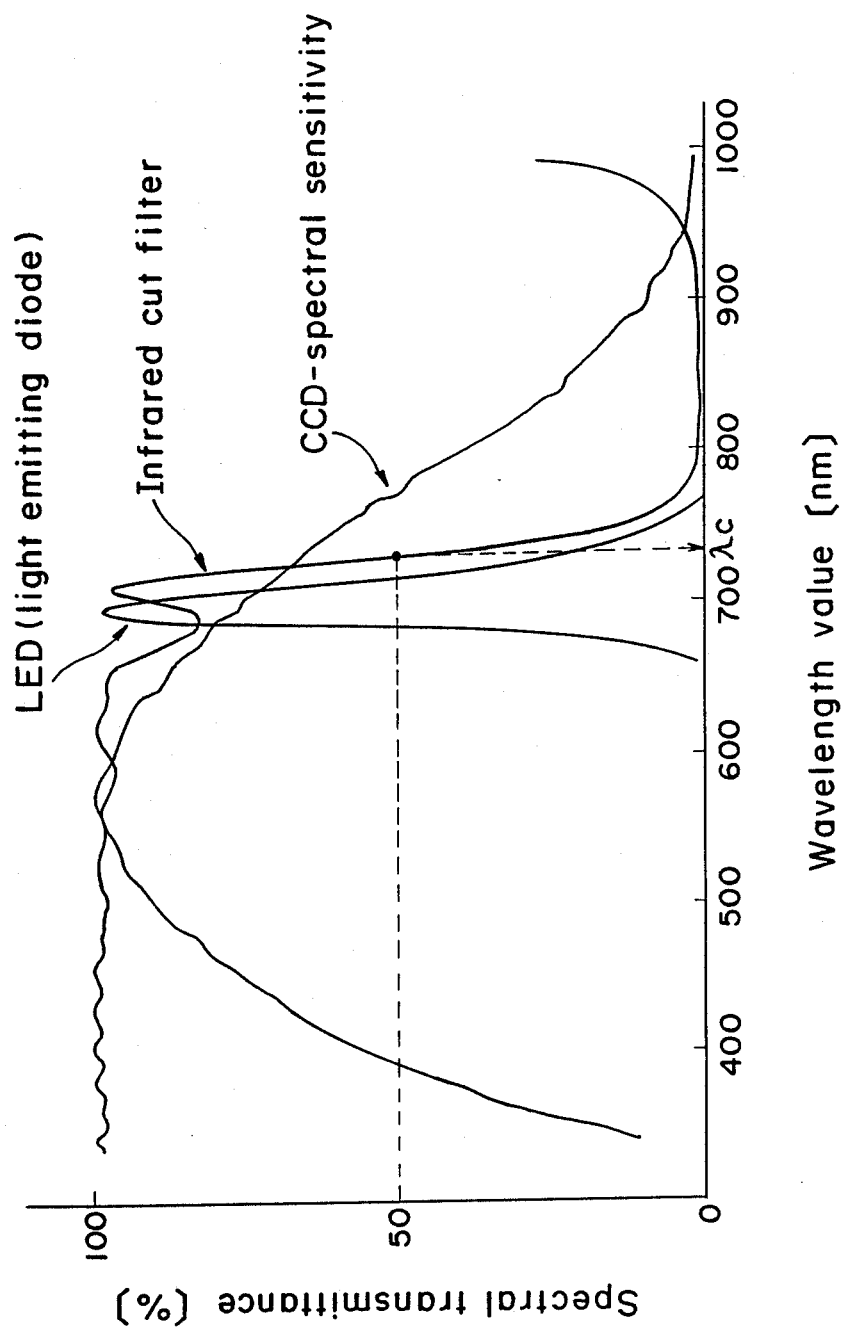

FIG. 9 shows spectral sensitivity of the focus detection sensor and spectral transmittance of an infrared cut filter. The infrared cut filter, being intended to cut infrared rays unnecessary for focus detection, is disposed in the optical path for the focus detecting optical system. The abscissa represents wavelength value and the ordinate represents spectral sensitivity or spectral transmittance.

It can be understood from FIGS. 7, 8, and 9 that the chromatic aberration value ΔIR of the photographing lens is greater when the object is illuminated by rays of light which largely contain an infrared light component, such as tungsten light, whereas the chromatic aberration value ΔIR of the photographing lens is smaller when the object is illuminated by rays of light containing only a slight amount of the infrared region component, such as daylight (sunlight). For quantitative examination of this fact, tests were made with a focus detection sensor having the performance characteristics as shown in FIG. 9 to determine how the aberration value ΔIR of a photographing lens would vary depending upon the type of light source used while varying the infrared cut filter in performance characteristic value (wavelength level at or above which infrared rays are to be cut). The performance characteristics of the infrared cut filter are expressed in terms of cut wavelength λc at which the transmittance is 50%.

Figure 10:
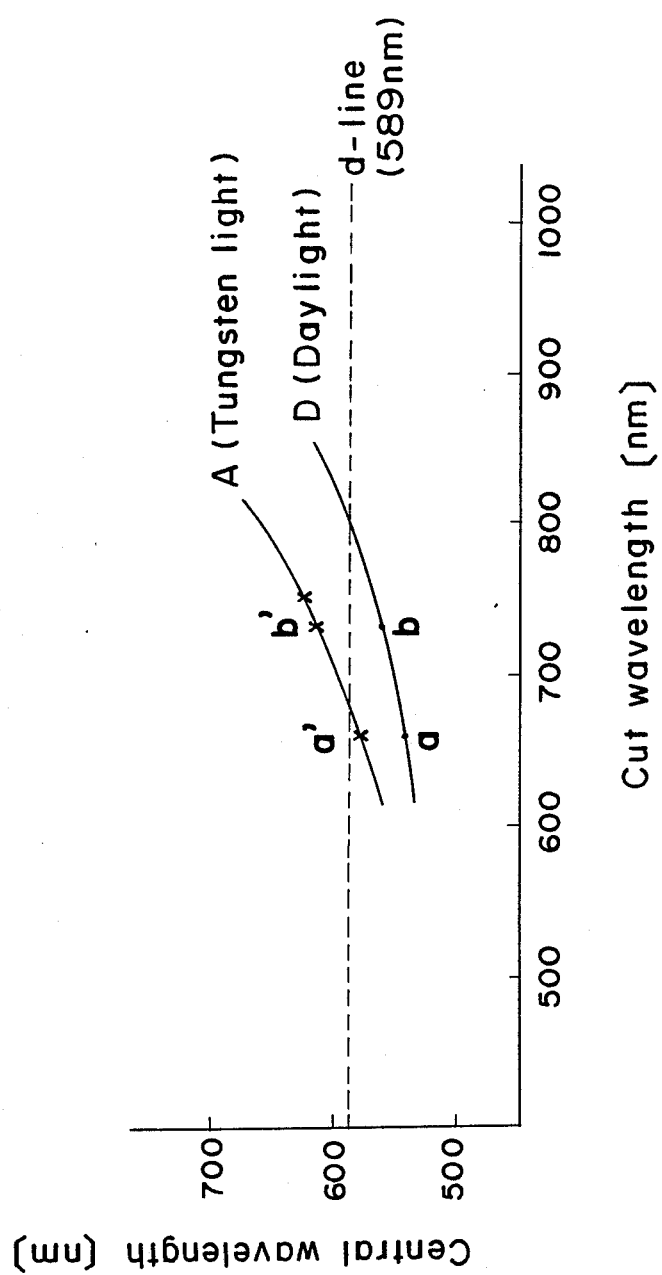

FIG. 10 shows changes of center of wavelength, a factor of which is determined by relative characteristics of the focus detection sensor and the source of light, as the infrared cut filter is varied in cut wavelength λc. In FIG. 10, source of light "A" corresponds to tungsten light and source of light "D" corresponds to daylight (sunlight). Fluorescent light is omitted because it contains little infrared component. As in FIG. 7, the d-line of 589 nm is taken as the base. It can be seen from the graph that the higher the cut wavelength level, the greater is the relative deviation in focus position between the different sources of light used in lighting the object. Concurrently, the deviation from the base d-line also tends to become greater. In order to determine the upper limit of infrared cut wavelength, representative values of cut wavelength λc are plotted on the wavelength-chromatic aberration ΔIR curve in FIG. 7. Points represented by characters a, a', b, and b' in FIG. 10 correspond to those shown by the like characters on the curve in FIG. 7. It can be seen from the graphs in FIGS. 7 and 10 that where λc≦730 nm, there is not much deviation in focus position due to difference in source of light (e.g., between sunlight and electric lamp). Further, judging from the relative luminosity curve shown in FIG. 6, it is desirable that the wavelength of light emission should be set at a level not lower than 680 nm in consideration of the degree of excitation of light to human eye.

For the above mentioned reasons, it may be concluded that the wavelength of light emission from the light projecting means should preferably be within the range of 680~730 nm, and that if the focus detection sensor has no sensitivity to infrared rays of longer wavelengths than 730 nm, focus deviations due to difference in source of light need not be considered as far as passive type of autofocussing is concerned.

Next, let us consider how far the focus position will vary in the case of active type of autofocussing. As already stated, it is desirable that the wavelength of light emission should be not lower than 680 nm, and that in view of the condition of λc≦730 nm, it should be within the range of 680~730 nm. FIG. 9 shows, by way of example, wavelength characteristics of a light emitting diode having a peak wavelength of light emission. Generally, in the case of active type of autofocussing, the level of ambient light is low and light rays emitted by the light emitting diode (680~730 nm) are dominant; therefore, the influence of a chromatic aberration of the photographing lens cannot be neglected. This may be clearly understood from FIG. 7, in which it is shown that the chromatic aberration curve of the photographing lens takes a linearly upward trend as the wavelength exceeds the base d-line of 589 nm. Thus, in the case of active type of autofocussing, it is necessary to make chromatic aberration corrections.

It must be considered in this connection that unless the level of ambient light is really zero, light rays incident on the focus detection sensor are a combination of ambient light and a light beam emitted by the light emitting diode. From this it follows that the central wavelength of the light rays incident on the focus detection sensor will vary according to the amount of the ambient light component, with the result of progressive deviation in focus position. FIG. 11 shows by way of example a pattern of changes in focus position depending upon the presence or absence of ambient light. In FIG. 11, the abscissa represents object distance and the ordinate represents the shift amount of the photographing lens corresponding to a change in focus position. Where ambient light is absent, the shift amount of the photographing lens relative to the object distance is in almost complete agreement with the calculated value therefor. Where ambient light is present, however, the shift amount of the lens tends to deviate from the calculated value in proportion as the object distance increases. This can be explained by the fact that in proportion as the object distance increases, the quantity of light rays from reflected light (light emitting diode) returning to the focus detection sensor tends to decrease, while on the other hand the proportion of ambient light tends to increase.

Thus, according to the arrangement proposed by this invention, during active type of autofocussing operation, the level of reflected light (ambient light) from the object in the case of no light being emitted by the light projecting means (light emitting diode) and the level of reflected light (ambient light+light from the light emitting diode) from the object in the case of light being emitted by the light projecting means are separately measured, and the chromatic aberration information stored in the photographing lens is adjusted on the basis of the results of arithmetic operation of the measurements, whereby accurate focus detection can be made.

Now, one embodiment of the focus detecting device according to the invention will be described in detail with reference to FIGS. 1 through 5, inclusive.

Figure 1:
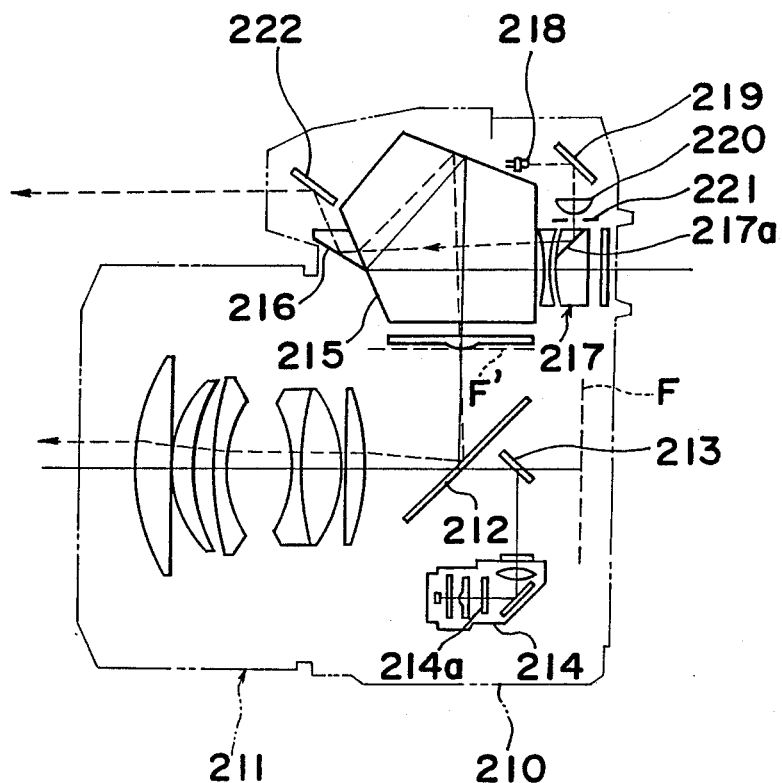
FIG. 1 is a view showing a single lens reflex camera incorporating a focus detecting device according to a preferred embodiment of the invention.
Figure 2:
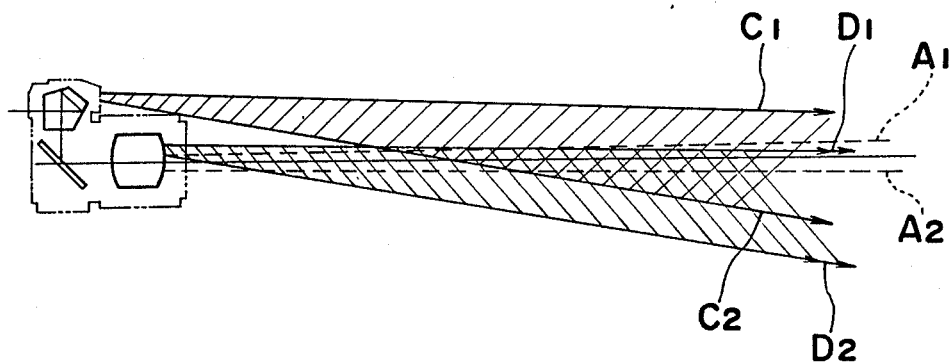
FIG. 2 is an explanatory view showing a spread of light rays emitted by a light projecting optical system.

FIG. 1 shows by way of example a single lens reflex camera incorporating the focus detecting device of the invention. In FIG. 1, numeral 210 designates a camera body, 211 designates an interchangeable photographing lens, and 212 designates a reflex mirror which reflects incident light rays toward a finder unit, a part of the light rays being transmitted through a center portion of the mirror and reflected by an optical path deflection mirror 213 for being guided to a focus detecting module 214. An infrared cut filter 214a is mounted in the module 214. Shown by 215 is a pentagonal prism, one of the component elements of the finder unit, with a minor prism 216 jointed to a front portion of the pentagonal prism 215. The joint surface between the pentagonal prism 215 and the minor prism 216 forms a filter which reflects visible light and which partially reflects and partially transmits infrared rays. Numeral 217 is an ocular system disposed behind the pentagonal prism 215. In a portion of a component lens of the ocular system 217, at a level above the optical axis of the finder, there is formed a filter 217a which transmits visible light and reflects the light from the light emitting diode. The position of the filter 217a is set at a specific angle such that a projected light beam of light emission from a light emitting diode 218, one form of light projecting means, (said projected light being shown by a broken line) will cross the optical axis (shown by a solid line) of the photographing lens on a predetermined focus plane F' equivalent to a film surface F for photographing.

In other words, the filter 217a is disposed so as not to allow the optical axis of the optical projection system and the optical axis of the focus detecting optical system to have a point symmetry relationship with the optical axis of the photographing lens on a main plane of the lens, thereby to eliminate the influence of any harmful reflected light arising from plane-to-plane reflection of light among lens components of the photographing lens. If such symmetry relationship exists, there may develop interference of light rays. For the light emitting diode 218 as one form of the light projecting means, one which emits a light beam of the wavelength characteristics shown in FIG. 9 (wavelengths in the boundary region between visible light and infrared light) is used. Numeral 219 is a reflecting mirror which reflects toward the finder optical system 217 a light beam emitted by the light emitting diode; 220 is a projector lens for condensing light beams reflected by the reflecting mirror 219; and 221 is a diaphragm. Shown at 222 is an optical path deflecting mirror disposed above the minor prism 216 for deflecting a light beam emitted by the light emitting diode and transmitted through the pentagonal prism 215 and the minor prism 216 so that the light beam will be directed to the optical axis of the photographing lens.

According to the above described optical projection system, a light beam emitted by the light emitting diode 218 is incident on the finder optical system 217 via the mirror 219 and lens 220. Since the filter 217a is provided in the finder optical system at a level above the optical axis thereof, the light from the light emitting diode is reflected by the surface of the filter 217a before it becomes incident on the pentagonal prism 215. The light incident on the pentagonal prism 215 is separated into two parts there, because the filter formed on the joint surface between the pentagonal prism 215 and the minor prism 216 serves concurrently as a semi-transmittance mirror. The part of the light transmitted through the filter is reflected upward by the minor prism 216, then reflected forward by the mirror 222, and from the front of the camera it is projected toward the object. The spreading of this projected light is within a range shown by $C_1$, $C_2$, being preset so that the light will light a relatively distant object. In other words, it is arranged so that the projected light will go into overlapping relation with a focussing range $A_1$-$A_2$ at a comparatively distant spot.

Meanwhile, the part of the light reflected by the filter formed on the joint surface between the pentagonal prism 215 and the minor prism 216 is allowed to advance in the reverse direction in the pentagonal prism 215, being then reflected within the prism so that it will pass a cross point on the target focus plane F' through which the optical axis of the photographing lens passes. Subsequently, the light is reflected by the reflex mirror 212 and projected toward the object through the photographing lens 211. The spread of this projected light is within a range shown by $D_1$, $D_2$ in FIG. 2 so that the light will light an object at a relatively short distance. In other words, it is intended that the spread range of this projected light will go into overlapping relation with the focussing detection range $A_1$-$A_2$ at a less distant spot.

In the embodiment shown in FIG. 1, it has been mentioned, the joint surface between the pentagonal prism 215 and the minor prism 216 forms a filter which reflects visible light and which partially reflects and partially transmits the light emitted from the light emitting diode, but alternatively, it may be arranged that a part of the filter reflects visible light and transmits the light from the light emitting diode, while the remaining part of the filter reflects both visible light and the light from the light emitting diode.

Figure 3:
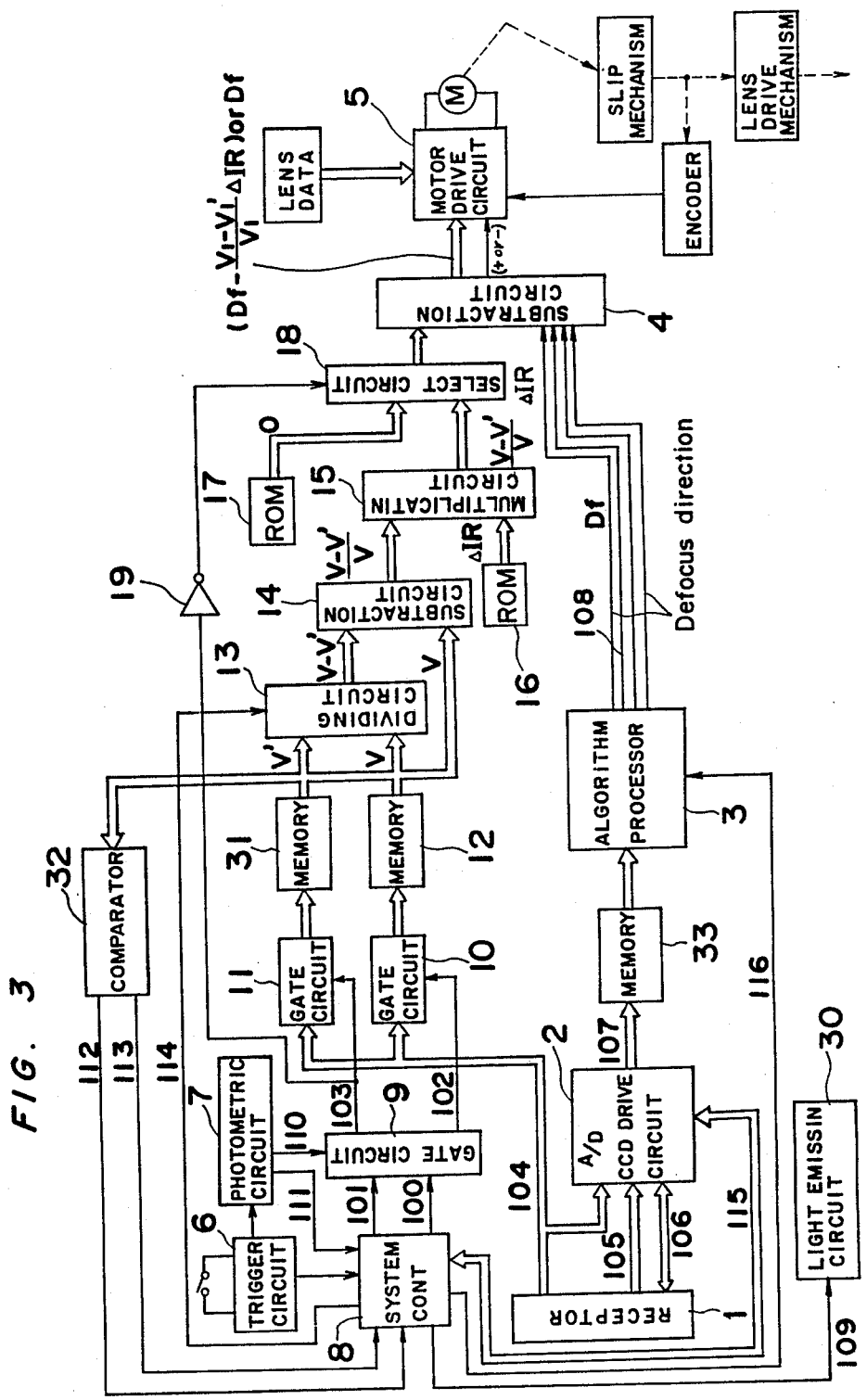
FIG. 3 is a block diagram showing the focus detecting device according to the embodiment of the invention.
Figure 4:
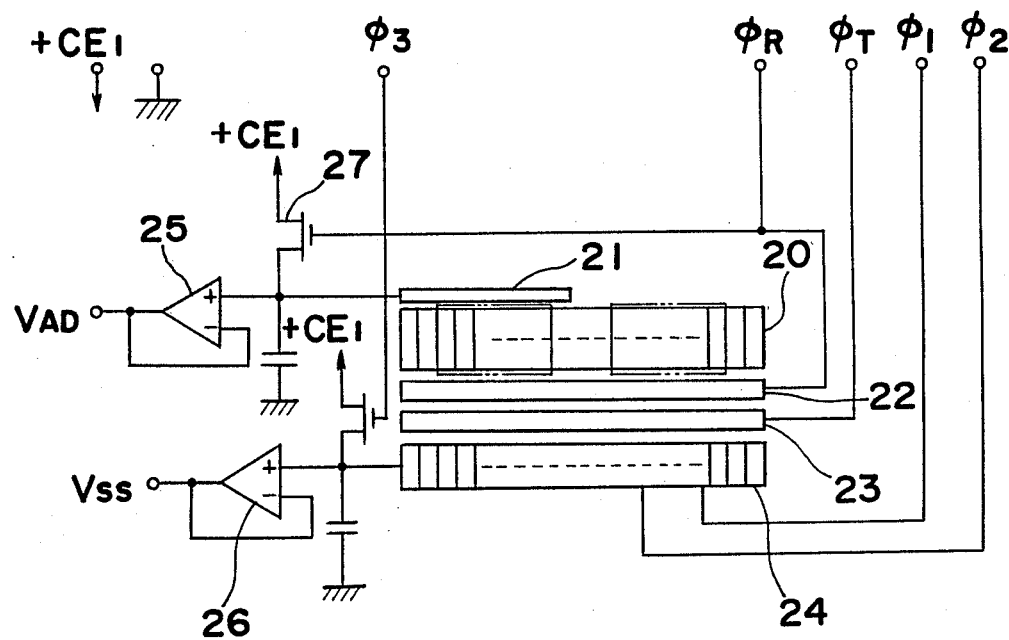
FIG. 4 is a detail view showing a focus detection sensor by way of example.

FIG. 3 is a block diagram showing by way of example one form of the focus detecting device. In FIG. 3, numeral 1 designates receptor means or a focus detection sensor unit, which consists of an array of receptor elements, such as CCD or the like. Numeral 2 is a circuit for analog-digital (A/D) conversion and sensor driving, which carries out A/D conversion of a signal from the focus detection sensor 1 and signals data so converted. This circuit 2 also issues a signal to the focus detection sensor 1 for driving the same. Details of the focus detection sensor unit 1 are shown in FIG. 4. In the figure, 20 is a line sensor consisting of one-dimensionally arranged photodiodes, there being provided on the front surface thereof an infrared cut filter (not shown in FIG. 4) which corresponds to the member 214a in FIG. 1 and is arranged to cut infrared rays of any wavelength longer than 730 nm. The output of the photodiodes of this line sensor 20 are transferred parallel to a shift register unit 24 via a transfer gate 23, being then supplied as signals $V_{SS}$ from an output terminal of an operational amplifier 26. Shown by 21 is an elongate rectangular photodiode, the output of which is supplied as a signal $V_{AD}$ from an output terminal of an operational amplifier 25. The photodiode 21, being a monitoring element for measuring a mean quantity of light incident on the line sensor 21, is disposed adjacent the line sensor 20. Numeral 22 is an integral clear gate which clears electric charges accumulated in the respective photodiodes of the line sensor 20 when an integral clear pulse $\phi_R$ is at a high level. Numeral 27 is an integral clear boot, which clears an electric charge produced in the monitoring element 21 when an integral clear pulse $\phi_R$ is at a high level. A charge shift gate 23 parallely shifts to the shift register unit 24 the electric charges accumulated by the respective photodiodes in the line sensor 20 when a shift pulse $\phi_T$ is at a high level. The shift register unit 24 transfers accumulated electric charges to the operational amplifier 26 sequentially according to clock pulses $\phi_1$, $\phi_2$, whereby signal readouts are carried out. Each output signal $V_{SS}$ from the line sensor 20 is supplied into the A/D conversion and sensor drive circuit 2 through a signal line 105 in FIG. 3 and is A/D converted therein. The signal so converted are supplied into a memory circuit 33 via a signal line 107 for being stored therein.

Numeral 3 designates an algorithmic processor which processes input signals according to a predetermined algorithm to determine a defocus quantity Df and direction of defocussing. The resulting datas are sent forward through signal lines 108. Numeral 4 is a subtraction circuit which carries out subtraction operation with respect to an input data from the algorithm processor 3 and an input data from a multiplication circuit 15 (to be described hereinafter) or from ROM 17. Numeral 5 is a motor drive circuit which drives a motor for actuating the photographing lens on the basis of an input information from the subtraction circuit 4. Numeral 6 is a trigger circuit which issues a focus detection start signal according to the ON or OFF state of a shutter button switch or a separate switch, said signal being applied to a photometric circuit 7 and a system controller 8. The photometric circuit 7 starts operation in accordance with a focus detection start signal to measure the brightness of the object, and if the resulting photometric value is lower (i.e., dim) than a predetermined level, it issues a signal to a gate circuit 9 and the system controller 8 through signal lines 110 and 111. It is noted that instead of the photometric circuit 7 being provided, the monitor 21 may be made to serve as a substitute therefor.

The system controller 8 starts operation according to the focus detection start signal from the trigger circuit 6 and issues a signal to the A/D conversion and sensor drive circuit 2, a gate circuit 9, a light emission circuit 30, and the algorithm processor 3. The system controller 8 controls individual circuits so that each circuit will perform its predetermined operation in active type of autofocussing mode or passive type of autofocussing mode, as the case may be. Details of this operation will be described hereinafter. The gate circuit 9 performs gate opening and closing operations according to a signal received from the photometric circuit 7 via the signal line 110. That is, if the brightness of the object is lower than a specified level, the circuit 9 opens the gates and supplies to signal lines 102 and 103 signals received from the system controller 8 through signal lines 100 and 101, respectively. Numerals 10, 11 are gate circuits which perform gate opening and closing according to a signal received from the gate circuit 9. Numerals 12 and 31 are memory circuits which temporarily store therein signals received from the monitor 21 of the receptor unit 1 through the gate circuits 10 and 11, respectively. Numeral 13 is a subtraction circuit which performs subtraction operation with respect to signals received from the memory circuits 12 and 31 and outputs the resulting difference value. Numeral 14 is a dividing operation circuit which calculates a ratio between an input from the subtraction circuit 13 and an input from the memory circuit 12 and outputs the calculated value. Numeral 15 is a multiplication circuit which performs multiplication with respect to an input from the dividing operation circuit 14 and information stored in ROM 16 and outputs the result. Numeral 16 is a read-only memory (ROM) incorporated in the interchangeable photographing lens and has chromatic aberration information $\Delta IR$ stored fixedly therein for the photographing lens. Numeral 17 is a read-only memory (ROM) provided in the camera body and has a value 0 stored therein. Numeral 18 is a select circuit which supplies selectively to the subtraction circuit 4 the information stored in the ROM 17 and information received from multiplication circuit 15 on the basis of information received through the signal line 103 of the gate circuit 9 via an inverter circuit 19. A comparator 32 has two reference levels Vref 1, Vref 2 (Vref 2 > Vref 1). The comparator 32 compares a signal received from the memory circuit 12 with Vref 1, Vref 2, and according to the comparison result it issues three kinds of signals to the system controller 8 through signal lines 112, 113.

Next, the manner of operation in the above described arrangement will be explained with reference to the timing chart illustrated in FIGS. 5a, 5b, 5c. When the camera user first touches the shutter button, the shutter button switch is closed and the trigger circuit 6 issues a focus detection start signal, which is then applied to the photometric circuit 7 and system controller 8. If the brightness of the object is then lower than a specified value, the photometric circuit 7 issues a signal to the gate circuit 9 and system controller 8 through signal lines 110 and 111 respectively. Upon receipt of the signal, the gate circuit 9 is turned open so that the output lines 100 and 101 of the system controller 8 are connected to lines 102 and 103, respectively. The system controller 8, upon receipt of the output signal from the photometric circuit 7, issues a signal to the light projector 30 (comprising the light emitting diode 218 or the like) through the signal line 109 to cause the projector 30 to emit light for a predetermined time $T_1$ according to the timing to be described hereinafter. The light emitted by the projector 30 is transmitted through the pentagonal prism and the photographing lens etc. as described earlier so that it is projected onto the object.

In FIG. 5, if the integral clear pulse $\phi_R$ reaches high level "1" at time $t_0$, the integral clear gate 27 for monitoring is opened and the electric charge in the monitor unit 21 is discharged via said clear gate 27, the monitor unit 21 being thus initialized. Simultaneously, the integral clear gate 22 is opened and the electric charge accumulated in the line sensor 20 is discharged via said clear gate 22, the line sensor 20 being also initialized. At time $t_1$, when the monitor unit 21 and line sensor 20 have already been initialized, accumulated electric charge therein is zero. When an emit-light signal from the system controller 8 is applied to the light projector 30 via the signal line 109 at time $t_1$, light emitted by the projector 30 is projected toward the object, and thus reflected light from the object, of the projector-emitted light, and other light, i.e., ambient light, are incident on both the monitor unit 21 and the line sensor 20. Since the integral clear gate 27 is open, the output from the monitor 21 is transferred to an accumulator unit consisting of a capacitor and is accumulated therein; and a value for such accumulation (integrated value) is dispatched from the output terminal of the operational amplifier 25. This output, given in the form of an output signal $V_{AD}$, is received into the gate circuits 10 and 11. At time $t_2$, or a certain time after the initiation of light emission by the light projector 30, a shift pulse $\phi_T$ from the A/D conversion and sensor drive circuit 2 is applied to the shift gate 23 according to an instruction from the system controller 8, and accordingly the shift gate 23 is opened so that electric charges produced in the respective photodiodes of the line sensor 20 are shifted to the shift register unit 24 through the transfer gate 23. Simultaneously, a signal from the system controller 8 is transmitted to the gate circuit 9 through the signal line 100. Since the gate circuit 9 is then in open state, this output signal is applied to the gate circuit 10 through the signal line 102 so that the gate of the gate circuit 10 is opened. At time $t_3$ after lapse of time period $T_1$ from the start of light emission by the light projector, the system controller 8 signals the light projector 30 via the signal line 109 for stopping light emission, and simultaneously the controller 8 issues a signal of low level "0" to the gate circuit 0 via the signal line 100, whereupon the gate 9 is closed. Accordingly, aforesaid signal $V_{AD}$ is stored in the memory circuit 12. This signal stored in the memory circuit 12 is an integral value of light rays incident on the monitor unit 21 (light emitted by the light projector-+ambient light) in time period $T_1$ during which the light projector is in light emission. The output signal from the memory circuit 12 is compared with two reference levels Vref 1 and Vref 2 in the comparator circuit 32. The electric charges transferred to the shift register unit 24 of the line sensor 20 are sequentially outputted as signal $V_{SS}$ by the operational amplifier 25, and only when the result of comparison in the comparator circuit 32 is Vref $1 < V <$ Vref 2, these signals $V_{SS}$ are stored in the memory circuit 33 after A/D conversion, whereas if $V <$ Vref 1 or $V >$ Vref 2, the signals are not stored therein. The reason is that if $V <$ Vref 1, the brightness of light on the line sensor 20 is low and accordingly the signals $V_{SS}$ are feeble and noisy; thus, if focus detection is made at all on the basis of the signals $V_{SS}$, the result would be unreliable. If $V >$ Vref 2, the intensity of light rays incident on the line sensor 20 is high and possible saturation of accumulated charges on several photodiodes would make it unlikely that the signals $V_{SS}$ correspond to the intensity distribution; therefore, even if focus detection is made on the basis of the signal $V_{SS}$, the result would also be unreliable. At time $t_4$, the integral clear pulse $\phi_R$ is rendered "1", accumulated charge clearing is made as in the earlier case, and at time $t_5$ charge accumulation is commenced again. This time, no light projection is made by the light projector 30. The charge accumulation is made only for time period $T_1$ beginning from time $t_5$. At time $t_6$, the accumulated charges are shifted to the shift register unit 24. Simultaneously, a signal from the system controller 8 is sent to the gate circuit 9 via the signal line 101. After its passage through the gate circuit 9, which is then already in open state, the signal is applied to the gate circuit 11 via the signal line 103. When the signal is applied to the gate circuit 11, the circuit 11 is opened and a signal $V_{AD}$ representing an accumulated value of the charge supplied by the monitor unit 21 is sent to the memory circuit 31. At time $t_7$, the signal from the system controller 8 which is applied to the gate circuit 11 is rendered "0", and the gate circuit 11 is closed; and signal $V_{AD}$ is stored in the memory circuit 31. This signal stored in the memory circuit represents an integrated value of only ambient light incident on the monitor unit 21 during time period $T_1$ Where the output of the memory circuit 31 is $V'_1$, $V'_1 < V_1$. The difference between $V'_1$ and $V_1$ corresponds to the quantity of reflected light from the object of the light emitted by the light projector. It is noted that with a shift pulse $\phi_T$ which becomes "1" at time $t_6$, signals $V_{SS}$ are given by the line sensor 20; however, the signal $V_{SS}$ given by the line sensor 20 during the time of no light emission by the light projector are not utilized as information for focus detection during active type of autofocussing operation and therefore they are not stored in the memory circuit 33. It is also noted that the output signal $V_1'$ given by the monitor unit during the time of no light emission by the projector is only required for the purpose of calculation in connection with the adjustment of chromatic aberration $\Delta$IR to be described hereinafter, and no decision is made as to its level relative to Vref 1 or Vref 2.

Figure 5A:
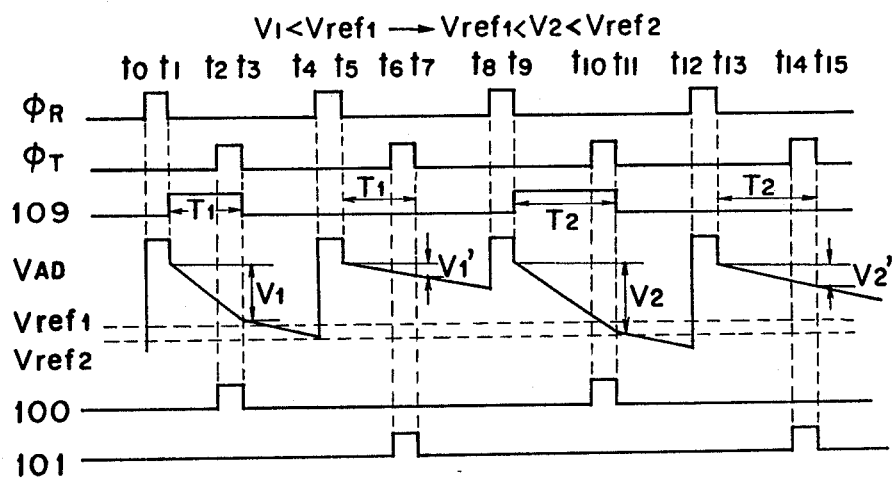
FIGS. 5(a), 5(b), and 5(c) are timing charts illustrating the manner of focus detecting operation under active type of autofocussing mode of the focus detecting device.
Figure 5B:
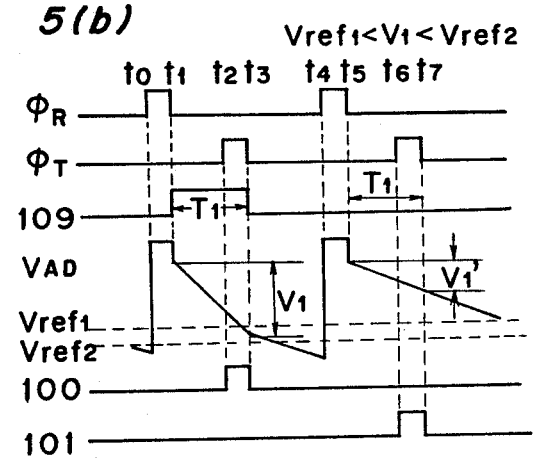

FIG. 5b represents the case where Vref $1 < V_1 <$ Vref 2. In this case, output signals $V_{SS}$ of the line sensor 20 under light emission by the light projector 30 have been already stored in the memory circuit 33 after A/D conversion thereof. After time $t_7$, the system controller 8 supplies a signal to the algorithm processor 3 through the signal line 116, whereupon the algorithm processor 3 processes the signals stored in the memory circuit 33 in accordance with a predetermined algorithm to determine the quantity of defocus and direction of defocussing, so that a signal Df based on this operation is outputted to the signal line 108. Whilst, at a point of time when the storage of the signal in the memory circuit 31 is finished, a signal from the system controller 8 is sent through the signal line 114 to the subtraction circuit 13, which in turn calculates $V_1 - V_1'$ to determine the light component emitted by the light projector 30 of the reflected light from the object, the result being signalled to the division operation circuit 14. The division circuit 14 processes the $V_1 - V_2$ data and the output of the memory circuit 12 to determine $(V_1 - V_1')/V_1'$, that is, (light from the projector)/(light from the projector-+ambient light). The result of this operation is supplied to the multiplication circuit 15. At one input end of the multiplication circuit there has been received information $\Delta$IR corresponding to the chromatic aberration of the photographic lens, from the ROM provided in the lens. Multiplying operation is made with respect to this information $\Delta$IR and said $(V_1 - V_1')/V_1$ value. Thus, the chromatic aberration of the photographing lens is corrected. For said chromatic aberration value $\Delta$IR, a value at the central wavelength of the light ray emitted from the light projector 30 is stored in the ROM.

The chromatic aberration value thus corrected, $(V_1 - V_1') \times \Delta IR/V_1$, is supplied to the subtraction circuit 4 through the select circuit 18, and subtraction operation is carried out with said value as against the data for defocus amount Df received from the algorithm processor. The corrected amount of defocus as the result of this operation and a signal representing the direction of defocus are inputted into the motor drive circuit 5. This drive circuit 5 drives the motor according to said direction signal and the corrected amount of defocus. The rotation of the motor is transmitted by a mechanical transmission to the drive mechanism through a slip mechanism, whereby the optical focus system is finally adjusted to an in-focus position. The quantity of drive of the drive mechanism is electrically measured by a photoelectrical encoder, for example, and a signal for the measurement is inputted into the motor drive circuit, in which it is compared with the output from the subtraction circuit 4 so that accurate drive control of the motor for focusing is effected. Thus, focus adjustment in active type of autofocussing mode is completed.

FIG. 5a illustrates the case of $V_1 <$ Vref 1. In this case, the output signals $V_{SS}$ of the line sensor 20 resulting from the light projection by the light projector for time period $T_1$ are not stored in memory 33. Instead, the time period for light projection is extended from $T_1$ to $T_2$ and then control is effected in the same manner as that during the period of time $t_0$ to $t_7$. That is, at time $t_8$, with integral clear pulse $\phi_R$ set at "1", the monitor unit 21 and line sensor 20 are initialized, and then at time $t_9$, light emission of the light projector 30 is started. At time $t_{10}$, a signal for "1" is delivered into the signal line 100 to open the gate 10 and the electric charges accumulated in the respective photodiodes of the line sensor 20 are shifted to the shift register unit 24 so that signals $V_{SS}$ are sequentially obtained by clocks $\phi_1$, $\phi_2$, $\phi_3$. At time $t_{11}$, light emission by the light projector 30 is stopped and simultaneously the signal for the signal line 100 is set at "0" to close the gate 10. Accordingly, the variation in signal $V_{AD}$ obtained during time period $T_2$ for light emission is stored in the memory circuit 12. Then, the level of output $V_2$ of the memory circuit 12 relative to the two reference levels Vref 1 and Vref 2 is determined by the comparator 32. FIG. 5a shows the case of Vref $1 < V_2 <$ Vref 2. When this decision is made, the system controller 8 causes signals $V_{SS}$ to be given by the circuit 2, which signals are stored in the memory circuit 33. Then, at time $t_{12}$, with the integral clear pulse $\phi_R$ set at "1", initialization is effected, and without causing the projector 30 to emit light beginning from time $t_{11}$, the line sensor 20 and monitor 21 are again caused to carry out charge accumulation. At time $t_{14}$, the signal supplied in the signal line 101 is changed to level "1" and accordingly the gate 11 is opened so that $V_{AD}$ is led to the memory circuit 31 through the gate 11. At time $t_{15}$, the signal line 101 turns into "0" level condition and the gate 11 is closed, whereby the variation $V_2'$ in $V_{AD}$ during time $T_2$ in non-emission condition is stored in the memory circuit 31. Subsequently, arithmetic operations are carried out in the subtraction circuit 13, division circuit 14, multiplication circuit 15, selector circuit 18, and subtraction circuit 4 in the same manner as in the case of Vref $1 < V_1 <$ Vref 2 in FIG. 5b. Thus, $\Delta$IR is corrected with value $(V_2 - V_2')/V_2$ and value Df is adjusted with the value $\Delta$IR so corrected for focus adjustment. It is noted in this connection that $V_2 > V_1$ because $T_2 > T_1$, and that $V_2 >$ Vref 1 even if $V_1 <$ Vref 1, there being therefore great possibility of Vref $1 < V_2 <$ Vref 2. Even then, if $V_2 <$ Vref 2, with the light emission time period $T_2$ set longer than $T_1$, another cycle of similar control should be effected with the light emission time period set longer than $T_2$.

Figure 5C:
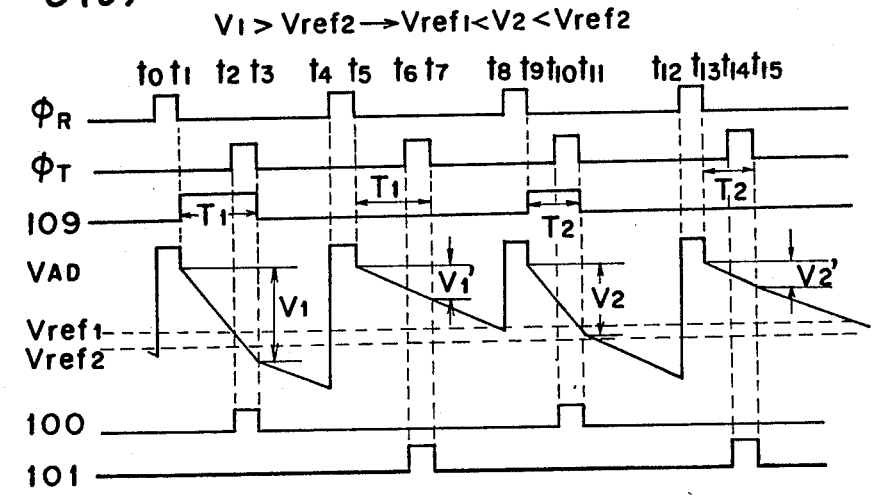

FIG. 5c shows the case of $V_1 >$ Vref 2. In this case, the light emission time period is shortened from $T_1$ to $T_2$, and the same manner of control as in the period of time $t_0$ to $t_7$ is performed for the period of time $t_8$ to $t_{15}$.

For $V_2$ in this case, the relation Vref $1 < V_2 <$ Vref 2 holes. Therefore, at and after time $t_{15}$, chromatic aberration value $\Delta$IR is adjusted with value $(V_2 - V_2')/V_2$, and value Df is adjusted with the corrected $\Delta$IR value for focus adjustment. If $V_2 >$ Vref 2, similar control should be carried out, with the light emission time period set shorter that $T_2$.

The system controller 8 is in communication with the A/D conversion and sensor drive circuit 2 through the signal line 115, and the control operation responsive to the integral clean pulse $\phi_R$ and shift pulse $\phi_T$ and the control operation according to the levels $V_1$, $V_2$ levels are carried out through this communication.

Next, focus adjustment in the case of the brightness of the object being higher than a predetermined value will be explained. In this case, the photometric circuit 7 sends an information signal to the effect to the gate circuit 9 and system controller 8. Upon receipt of this information signal, the gate circuit 9 goes into closed condition and never does apply output signals from the system controller 8 to the gate circuits 10, 11. Meanwhile, the output of the inverter circuit 19 connected to the signal line 103 of the gate circuit 9 is inverted, and the select circuit 18 is switched over so that the information stored in ROM 17 is inputted into the subtraction circuit 4. Since value zero is stored in ROM 17, the subtraction circuit 4 receives value zero thereinto. Therefore, the output of the subtraction circuit 4 is identical with the defocus value Df outputted by the algorithm processor 3. Consequently, the chromatic aberration information for the photographing lens is taken as zero for the purpose of focus adjustment. Further, because of the fact that the output from the photometric circuit 7 is received into the system controller 8, the operation of the system controller 8 is switched over to passive type of autofocussing mode and information to that effect is outputted to the A/D conversion and sensor drive circuit 2 through the signal line 115. In passive type of autofocussing mode the light projector is not caused to emit light, and therefore it is unnecessary to make such focus adjustment based on the results of two-time charge accumulation (during light emission and during no light emission) as in the case of active type of autofocussing. In passive type of autofocussing, therefore, operation is controlled so that focus detection and adjustment are made on the basis of one-time charge accumulation. In this case, by virtue of the infrared cut filter the line sensor 20 has no sensitivity to infrared light of a longer wavelength than 730 nm, and this eliminates the possibility of focus deviation according to the type of light source (sunlight, tungsten light, or the like).

Constructed as above described, the focus detecting device in accordance with the present invention permits proper and effective focus detection for visible light rays under both passive and active type of autofocussing modes, without the necessity of focus detection sensors being provided for both infrared light and visible light and without provision of color temperature measuring means.

Although the invention has been fully described about one embodiment thereof with reference to the accompanying drawings, it is to be noted here that various changes and modification will be apparent to those skilled in the art. For instance in the case of the above embodiment, if decision is $V_1 <$ Vref 1 or $V_1 >$ Vref 2, the line sensor 20 and monitor 21 are caused to perform charge accumulation operation once again for the same period of time as light emission time $T_1$, without the light projector 30 being caused to emit light. Since this has no positive meaning, however, the control operation of the system controller 8 may be modified so that at time $t_4$, it will proceed immediately to control for time $t_8$. Also, it is possible that without the light projector being allowed to emit light for the period of time $t_1$ to $t_3$, variation in $V_{AD}$ is stored as $V_1'$ in the memory circuit 31 at time $t_3$ and then for the period of time $t_5$ to $t_9$ the projector 30 is caused to emit light, the variation in $V_{AD}$ being stored as $V_1$ in the memory circuit 12 at time $t_9$. In this case, too, if decision as to the level of $V_1$ relative to Vref 1, Vref 2 is $V_1 <$ Vref 1 or $V_1 >$ Vref 2, the time period $T_1$ of light emission may be varied and the same cycle of control operation is repeated. Again, in the foregoing embodiment, decision as to $V_1$, $V_2$ is made as against two specified levels, Vref 1 and Vref 2, but alternatively it may be arranged that such level decision may be made in stepless manner so as to permit more accurate emission time period setting for subsequent photographing. Therefore, unless otherwise such changes and modifications depart from the scope of the present invention, they should be construed as included therein.

What is claimed is:

1. A focus detecting device for a lens interchangeable camera comprising:
    an interchangeable lens having an objective lens and storing means for storing a chromatic aberration signal indicative of the chromatic aberration of said objective lens;
    sensor means for receiving light, coming from an object to be photographed and being transmitted through said objective lens, to produce a light receiving signal corresponding to the intensity of light received;
    mode selecting means for alternatively selecting a passive mode and an active mode;
    light projecting means, activated when the active mode is selected by the mode selecting means, for projecting light having a specific wavelength range in a boundary region between visible light and infrared light;
    first focus detecting means, activated when the passive mode is selected by the mode selecting means, for detecting a focus condition of the objective lens on the basis of the light receiving signal generated when the object is illuminated by ambient light to generate a first focus condition signal representing the detected focus condition;
    second focus detecting means, activated when the active mode is selected by the mode selecting means, for detecting focus condition of the objective lens on the basis of the light receiving signal generated when the object is illuminated by the light projecting means to generate a second focus condition signal representing the detected focus condition;
    modifying means, activated when the active mode is selected by the mode selecting means, for modifying the chromatic aberration signal in accordance with a difference between, the light receiving signal of the sensor means with the light projecting means deactivated, and the light receiving signal of the sensor means with the light projecting means activated, to produce a modified chromatic abberation signal;
    correcting means, activated when the active mode is selected by the mode selecting means, for correcting the second focus condition signal in accordance with the modified chromatic aberration signal; and
    output means for outputting the second focus condition signal corrected by the correcting means upon actuation of said second focus detecting means.

2. A focus detecting device as claimed in claim 1, wherein the specific wavelength range of light projected by the light projecting means is 680 nm to 730 nm.

3. A focus detecting device as claimed in claim 2, wherein said sensor means is provided with an infrared cut filter so that no light beam of a longer wavelength than 730 nm may become incident on said sensor means.

4. A focus detecting device as claimed in claim 1, wherein said chromatic aberation signal stored in said storing means is indicative of the chromatic aberration of said objective lens with respect to the central wavelength of the wavelengths of the light projected from said light projecting member.

5. A focus detecting device a claimed in claim 1, wherein said output means includes means for outputting said first focus detection signal upon actuation of said first focus detecting means.

6. A focus detecting device as claimed in claim 1, wherein the light projecting means includes a light emitting diode.

7. A focus detecting device as claimed in claim 1 wherein the first and second focus detecting means includes a common detector array with an infrared cutoff filter as the sensor means.

8. A focus detecting device as claimed in claim 1 further including means for projecting light simultaneously through the objective lens and from a displaced portion of the camera.

9. A focus detecting device as claimed in claim 8 wherein the light projecting member is a light emitting diode with a primary emission of light between 680 and 730 nm.

10. A focus detecting device as claimed in claim 9 wherein the first and second focus detecting means includes a common detector array with an infrared cutoff filter.

11. A focus detecting device as claimed in claim 10 wherein the detector array is a planar linear array.

12. A focus detecting device for a lens interchangeable SLR camera, comprising:
    an interchangeable lens having an objective lens;
    means for providing a chromatic aberration signal indicative of the chromatic aberration of said objective lens with respect to a specific wavelength of light within the range of 680 to 730 nm;
    a first focus detecting means of a passive type for detecting a focus condition of said objective lens with respect to an object to be photographed, with use of an ambient light illuminating said object and thereby generating a first focus detection signal representing the detected focus condition;
    a second focus detecting means of an active type having a light projecting member, for detecting a focus condition of said objective lens with respect to said object with use of a light beam projected from said light projecting member to illuminate said object, and thereby generating a second focus detection signal representing the detected focus condition, said light beam projected from said light projecting member having specific wavelengths within the range of 680 to 730 nm;

control means for selectively actuating said first and second focus detecting means, said control means including means for activating and said light projecting member upon actuation of said second focus detecting means;

a sensor means which is responsive to both said ambient light and said light beam projected from said light projecting member;

calculating means for calculating the difference between the output of said sensor means with said light projecting member deactivated and that of said sensor means with said light projecting means activated, to thereby produce a correction signal;

correction means for correcting said chromatic aberration signal by said correction signal; and output means for outputting said first focus detection signal upon actuation of said first focus detecting means and outputting said second focus detection signal corrected by the chromatic aberration signal upon actuation of said second focus detecting means.

13. A focus detecting device as claimed in claim 12 wherein the light projecting member is a light emitting diode.

14. A focus detecting device as claimed in claim 12 wherein the first and second focus detecting means includes a common detector array with an infrared cutoff filter as the sensor means.

15. A focus detecting device as claimed in claim 12 further including means for projecting light simultaneously through the objective lens and from a displaced portion of the camera.

* * * * *